United States Patent
Khen et al.

(10) Patent No.: US 11,733,953 B2
(45) Date of Patent: Aug. 22, 2023

(54) INFORMATION HANDLING SYSTEM REMOTE ACCESS TO DISPLAY FUNCTIONALITY OF DAISY CHAINED DISPLAYS

(71) Applicant: Dell Products L.P., Round Rock, TX (US)

(72) Inventors: Thien Vui Khen, Singapore (SG); Karthikeyan Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 18 days.

(21) Appl. No.: 17/502,572

(22) Filed: Oct. 15, 2021

(65) Prior Publication Data

US 2023/0120557 A1    Apr. 20, 2023

(51) Int. Cl.
*G06F 3/14* (2006.01)
*G06F 3/0482* (2013.01)

(52) U.S. Cl.
CPC .......... *G06F 3/1423* (2013.01); *G06F 3/0482* (2013.01)

(58) Field of Classification Search
CPC ............................. G06F 3/1423; G06F 3/0482
See application file for complete search history.

(56) References Cited

U.S. PATENT DOCUMENTS

| | | | |
|---|---|---|---|
| 8,723,756 B2 | 5/2014 | Kim | |
| 9,164,722 B2 | 10/2015 | Hall | |
| 9,542,376 B2 * | 1/2017 | Shah | G06F 40/166 |
| 2016/0062725 A1 * | 3/2016 | Odagiri | G06F 3/1446 345/1.3 |
| 2018/0268782 A1 * | 9/2018 | Kaneko | G06F 3/1446 |
| 2020/0374152 A1 * | 11/2020 | Ceekala | H04L 12/40013 |
| 2021/0042081 A1 | 2/2021 | Mihara | |

\* cited by examiner

*Primary Examiner* — Sahlu Okebato
(74) *Attorney, Agent, or Firm* — Zagorin Cave LLP; Robert W. Holland

(57) ABSTRACT

Daisy chained displays that present information from an information handling system as visual images has remote support of display settings provided through an address assignment scheme to communicate display settings to specific displays of the daisy chain and allows each display to determine a numerical index of the display for presentation at the display. A remote control session for display settings accepts inputs based upon the numerical index presented at each display and sends the display setting inputs through the daisy chain to the address associated with the numerical index for application at the display.

13 Claims, 4 Drawing Sheets

INFORMATION HANDLING SYSTEM REMOTE ACCESS TO DISPLAY FUNCTIONALITY OF DAISY CHAINED DISPLAYS

BACKGROUND OF THE INVENTION

Field of the Invention

The present invention relates in general to the field of information handling system displays, and more particularly to an information handling system remote access to display functionality of daisy chained displays.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components and output the results to end users. Typically, processing output is presented as visual information at a display, such as a liquid crystal display (LCD) or organic light emitting diode (OLED) display. Flat panel LCD and OLED displays offer high quality visual images with a large viewing area and thin structure. Both portable and stationary information handling systems commonly interface with peripheral flat panel displays to present information as visual images with relatively large surface areas. Often, a single information handling system will support presentation of visual images simultaneously at multiple information handling systems. For example, a graphics processing unit (GPU) processes visual information to generate pixel values that are scanned across multiple displays. Operating systems often support end user selection of different display presentation modes, such as mirroring or side-by-side modes. An end user who has a large amount of visual information to consume simultaneously may interface four or more displays to one information handling system and interact with visual information at any of the displays with the same input devices. Multiple display setups have become popular with end users who interact with graphs and similar presentations, such as finance applications.

When viewing visual information at multiple displays, end users often prefer to place the displays in proximity with each other, such as in tiled arrangements that have the displays vertically and/or horizontally stacked adjacent to each other. When displays have wide or uneven bezel areas around their perimeter, the blank area of the bezels between the display areas tends to detract from the appearance of the displayed information. To help minimize this distraction, manufacturers have attempted to minimize the size of the bezel that surrounds the perimeter of the display area. One result of this trend is that manual display controls commonly found along the bottom of the display perimeter, such as power, contrast, brightness and other settings, have been moved to the back of the display. In addition to making the display bezel thinner, this approach also removes manual buttons so that the bottom side of the display perimeter has the same bezel thickness as the other sides. Even display bezel thickness on all four sides provides better vertical stacking of displays with all sides of a tiled display arrangement having similar bezel spacing. However, when multiple displays are vertically and horizontally stacked, the end user may have difficulty reaching manual controls located at the rear side of the display to adjust the display presentation.

An information handling system may interface with multiple displays through multiple different cables, such as when the information handling system has multiple display ports. In such a configuration, the end user can follow the cable to each display to determine the physical relationship between which display is presenting what visual information. In some instances, the end user can remotely control the display settings from the information handling system rather than reaching behind the display. As an alternative, multiple displays may interface with an information handling system through a single display port with a daisy chain configuration in which the information handling system couples to one display as an input that then outputs the visual information to other displays. For example, DisplayPort and Type C USB cables support daisy chain display configurations with bi-directional communication of control information through an auxiliary channel of the display cable. The order in which visual information is presented may vary based upon how the display cables interface between the plural displays so that an end user attempting to remotely control display settings instead of using manual controls will have difficulty tracking the positions of the displays and the remote setting controls available at the information handling system.

SUMMARY OF THE INVENTION

Therefore, a need has arisen for a system and method which manages information handling system remote access to display functionality of daisy chained displays.

In accordance with the present invention, a system and method are provided which substantially reduce the disadvantages and problems associated with previous methods and systems for managing daisy chained displays. An automated address assignment scheme defines an address for each daisy chained display that supports a logical index construction of each display's position in the daisy chain so that display setting commands to a logical index number presented at a display are communicated to the selected display with the address of the display in the daisy chain.

More specifically, an information handling system processes information with a processor and memory disposed in a housing and presents the information as visual images at plural peripheral displays interfaced through a daisy chained configuration. Each display of the plural daisy chained displays executes firmware instructions stored in non-transitory memory on a processing resource to coordinate an address assignment scheme that supports communication of display settings to selected of the daisy chained displays by reference to the address of the selected display. The address scheme has appended incremental address information at each daisy chain interval so that communication of an address of each display at the end of the daisy chain provides all of the displays a basis for constructing a logical index of the displays. During a remote control session for adjusting the display settings, each display can present its logical index number so that display setting inputs made at an information handling system user interface or at one of the display's manual input buttons to a logical index is forwarded through the daisy chain to the address associated with the logical index number.

The present invention provides a number of important technical advantages. One example of an important technical advantage is that an information handling system interfaced with daisy chained displays communicates through an address scheme and topology of the displays so that an end user can remotely control the displays based upon position using logical keys. The daisy chained displays autonomously assign addresses according to a scheme that appends incremental address information to an upstream display to define an address of a downstream display. The address scheme provides each display in the daisy chain to determine a logical index number for presentation that is applied to identify a target of a command for a display setting put into an information handling system user interface or manual display input user interface. An end user of daisy chained peripheral displays is provided with a clear display topology and logical index so that adjustments to individual display settings are simplified for a more pleasant end user experience.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Plural peripheral displays interfaced with an information handling system autonomously assign addresses that provide a logical index to support remote control of the displays with commands communicated from the information handling system or one of the displays. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
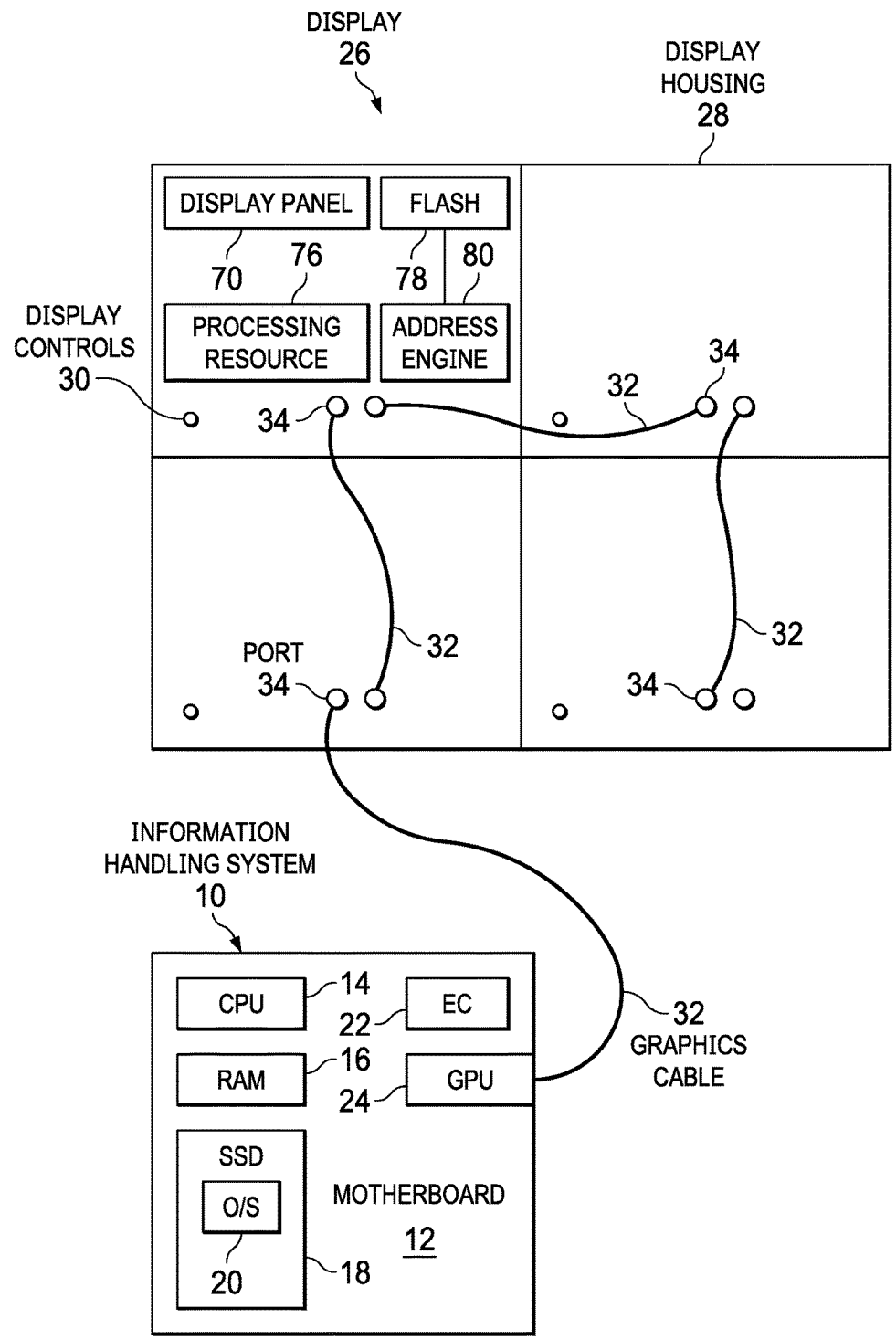
FIG. 1 depicts a block diagram of an information handling system interfaced with plural daisy chained peripheral displays configured to automatically generate an address scheme and logical index.

Referring now to FIG. 1, a block diagram depicts an information handling system 10 interfaced with plural daisy chained peripheral displays 26 configured to automatically generate an address scheme and logical index. Information handling system 10 processes information with processing components disposed in a housing to generate visual information for presentation at displays 26. In the example embodiment, a motherboard 12 supports communication of a central processing unit (CPU) 14 that executes instructions to process information with a random access memory (RAM)16 that stores the instructions and information. A solid state drive (SSD) 18 provides persistent storage of the instructions and information during power down of the system, such as an operating system 20 that manages communications with displays 26. For example, an embedded controller 22 manages operating conditions of processing components in the housing, such as application of power, and retrieves operating system 20 from SSD 18 to RAM 16 at power up. A graphics processing unit (GPU) 24 interfaces with CPU 14 to further process the information to define visual images, such as with pixel values applied at displays 26 to present visual images. GPU 24 interfaces with displays 26 through plural graphics cables 32 configured as a daisy chain. Each display 26 has a display housing 28 with plural display ports to accept one or more inbound and outbound streams of visual information, a display panel to present the visual information as visual images, and a processing resource to manage display operations. For example, the processing resource is a Display Controller, a timing controller, a system on chip or other type of processor or controller that executes instructions stored in non-transitory memory, such as a flash memory 78.

In the example embodiment, display graphic cables 32 have a daisy chain configuration in which a series of displays 26 present visual images provided from a single output feed of a video source. The graphics cable 32 from information handling system 10 couples to a first port 34 of display 26, which presents visual images from the visual information stream and forwards the visual information stream as an output from a second port 34 to a second display 26. The daisy chain of graphics cables 32 proceed as inbound and then outbound feeds until the daisy chain terminates. In the example embodiment, lower right display 26 is the terminal node of the daisy chain. Daisy chain presentation is managed by standard protocols, such as the DisplayPort and Type C USB output. For example, vendor defined messaging (PD VDM) or DDCCI methods may be used for inter-display communications. These standards and communication protocols are implemented so that multiple daisy chained displays present visual images communicated over a common graphics cable interface with the information handling system as if each display has a separate cable interface.

When displays 26 are daisy chained, an end user often lacks clarity regarding how control of the individual displays is managed and typically cannot reach physical display controls 30 located at the rear of each display. To aid in management of display settings, an address engine 80 stored in flash 78 of each display 26 executes on processing resource 76 to autonomously generate a unique address for each display 26 and a logical index that is selectively presented at each display 26 to identify the displays for an end user to manage display settings. Address engine 80 assigns a unique address to each node of the daisy chain, which allows VDM messages to be relayed across the daisy chain and terminated at the intended display node of the matching address. Once the unique addresses are defined, address engine 80 analyzes the address at each display to construct a topology and logical index naming that assigns a logical number for each display to present as an end user reference. During a remote control session to manage display settings, the logical index is presented so that an end user can manage individual display settings by reference to the logical index while the information handling system and displays communicate the display references by the address associated with each logical index number, such as with a broadcast across the daisy chain. End users are provided with an improved control of daisy chained displays through the unique address and topology construction, such as with broadcasting of logical keypresses to all display nodes of a daisy chain of displays.

Figure 2:
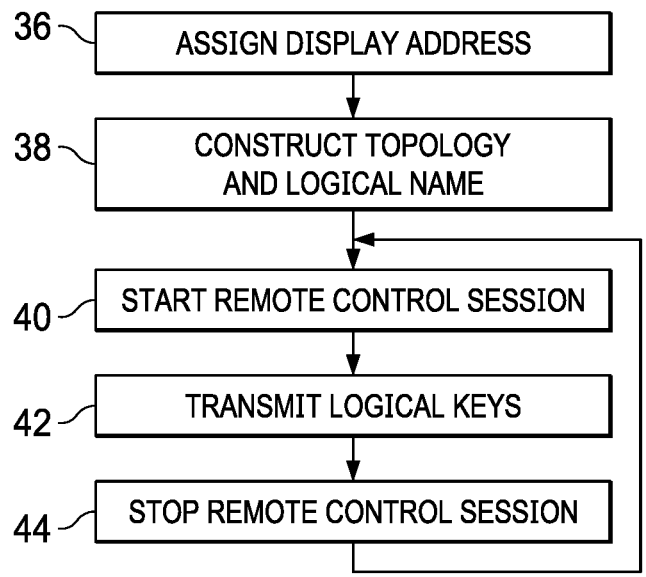
FIG. 2 depicts a flow diagram of a process for automatically generating an address scheme at daisy chained displays to support remote control of display settings.

Referring now to FIG. 2, a flow diagram depicts a process for automatically generating an address scheme at daisy chained displays to support remote control of display settings. The process starts at step 36 with the assignment of a display address to each display node of the daisy chained displays. In the example embodiment as described in greater detail below, each display appends incremental numerical address information to the display address of the display immediately upstream in the daisy chain. The address is determined at the upstream display based upon the upstream display's address and communicated to the downstream display. When a display does not have a downstream display, the final address of that node of the daisy chain is communicated upstream to allow all displays and the information handling system to determine the nodes of the daisy chain to that terminal node by looking at the appended numerical address information. At step 38, once each terminal node of the daisy chain communicates its address up the daisy chain, a topology is constructed at each display of the daisy chain and a numerical index is defined so that each display has a unique numerical index logical number. At step 40, the shared topology and numerical index at each display and the information handling system supports a remote control session for management of display settings through inputs at any one display's manual input buttons or at the information handling system user interface. For example, at initiation of a remote control session, all displays of the daisy chain present their logical index number and, at step 42, the end user selects displays to manage by reference to the logical keys that are transmitted through the daisy chain to command display settings at the associated displays. At step 44 the remote control session is terminated and the displays present visual information in an operational mode.

Figure 3A:
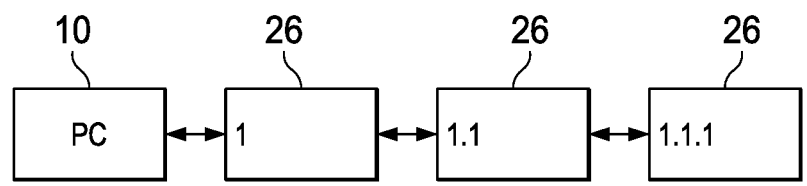
FIGS. 3A and 3B depict examples of daisy chained display address schemes automatically assigned at the daisy chained displays.
Figure 3B:
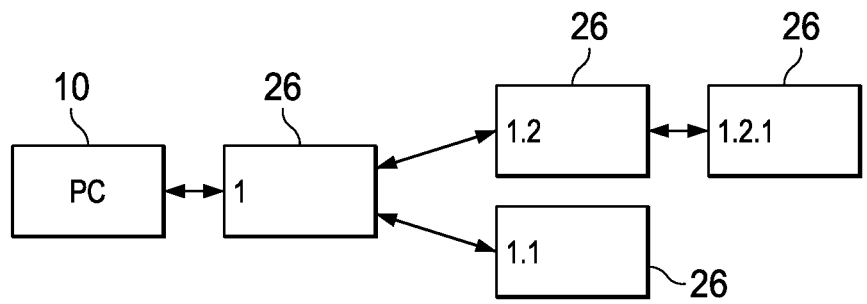

Referring now to FIGS. 3A and 3B, examples depict daisy chained display address schemes automatically assigned at the daisy chained displays. FIG. 3A depicts a linear daisy chain configuration having an information handling system 10 and three displays 26 daisy chained in series. Each display 26 has a unique address that appends the position of the display onto the address of the upstream display. For instance, the first display has an address of "1" and assigns the address "1.1" to the next display downstream. The second display has its position in the level of nodes indicated by a break of one period and assigns the address "1.1.1" to the next address downstream to indicate that it is the third node level with two periods. When the third display has the address assigned, it determines that it is the terminal node of the daisy chain with no downstream displays and responds by sending a last address message upstream to all displays in the daisy chain can construct a topology of the displays of the daisy chain that leads to the terminal node. FIG. 3B depicts an example of a multiple branch daisy chain that starts at an information handling system 10 output to a first display 26 having an address of "1". From the first display, the daisy chain branches to two displays, a first that is assigned an address of "1.1" and a second that is assigned an address of "1.2". The use of a single period in each address indicates the second level of nodes of the daisy chain and the numerical value uniquely defines the position of the two displays at the level of nodes of the daisy chain. The display addressed "1.1" sends a last address message to allow all displays to construct the daisy chain on that branch. The display addressed "1.2" detects another display on its branch and assigns that display an address having its own "1.2" value with the next node value appended after a period. When the display with the address "1.2.1" detects that no downstream display are interfaced, it sends a last address message that permits all displays of the daisy chain to construct the topology and logical index.

Figure 4:
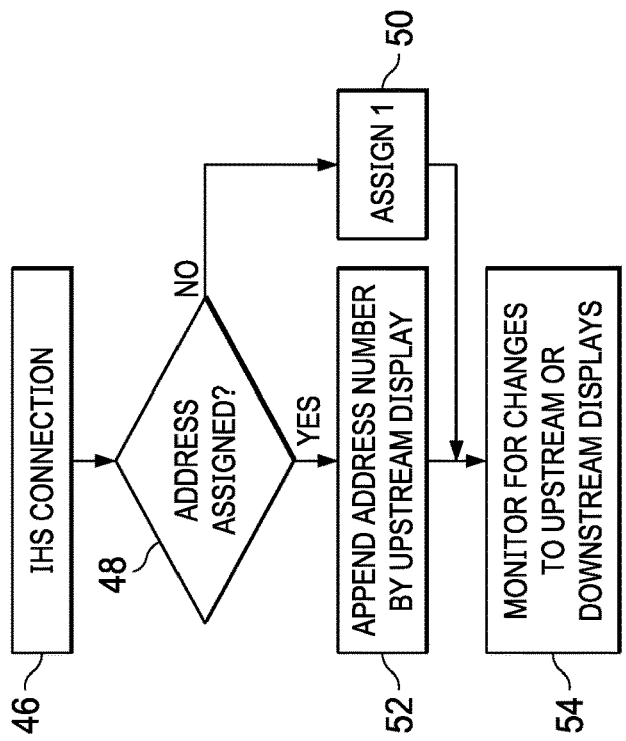
FIG. 4 depicts a flow diagram of a process for assigning a display address at a daisy chained display.

Referring now to FIG. 4, a flow diagram depicts a process for assigning a display address at a daisy chained display. The process starts at step 46 with an information handling system connection to a display. At step 48, the display that interfaces with the information handling system determines that no display address is assigned from an upstream display, since the upstream device is a host information handling system, and in response continues to step 50 to assign itself the address number 1. If at step 48 an upstream display is detected, the process instead continues to step 52 to append the upstream display address number with the address information of the display. For instance, when a display is assigned the address "1" it next determines what downstream displays are daisy chained and then assigns an address to each in numerical order appended to the first address. In the example embodiment, each display in the daisy chain assigns an address to each of its directly downstream displays when a downstream display is detected. In this arrangement, each display node does the address assignment of the next display node level. In alternative arrangements, the first display node performs all of the address assignments. Address assignments are performed when a downstream display is connected, when a current assigned address is reassigned by an upstream display, when an upstream display is disconnected resulting in assignment with a first address, and when a change of the active upstream port is detected, such as when two information handling systems are connected to the same display device. In assigning the address to a display, if there are more than one downstream port in the display that are active, the address number is incremented at the same tier level (e.g., 1.1, 1.2). If there are more than one upstream port, the node extends the address from the upstream port that is currently active. At step 54, the displays monitor for changes to the upstream or downstream displays, which result in a new address assignment process.

Figure 5:
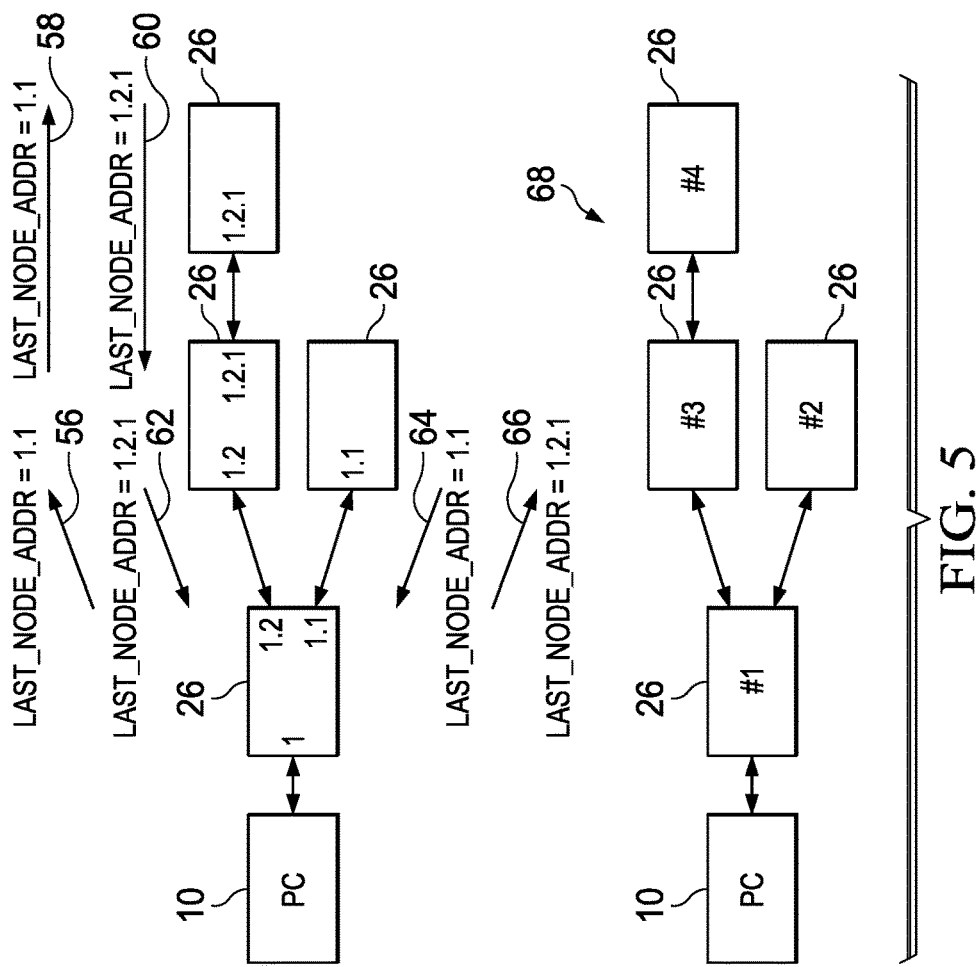
FIG. 5 depicts an example of a process for constructing a topology of the daisy chained displays from the addresses.

Referring now to FIG. 5, an example depicts a process for constructing a topology of the daisy chained displays from the addresses. The addresses of the example embodiment at displays 26 are taken from FIG. 3B and show a dual branch of displays interfaced with an information handling system 10. When the address "1.1" detects no downstream displays, it sends a last address message indicated by arrow 64 through the daisy chain of displays that is broadcast as indicated by arrows 56 and 58 so that each display has the last address on that branch of the daisy chain. Similarly, when the display with the address "1.2.1" detects that it has no downstream displays, it broadcasts a last address message as indicated by arrows 60, 62 and 66 so that all displays have the last address at that branch of the daisy chain. Each display in the daisy chain forwards the last address message down all branches so that the last address of every branch is published to all displays. Once each display has the last branch of all nodes, the display is able to locally construct the daisy chain topology and its own logical value in the topology. For instance in the example embodiment, last node addresses of "1.2.1" and "1.1" establishes a daisy chain of 4 nodes having two branches. The first branch has no additional nodes and the second branch has one additional node. By applying a common tree traversal scheme (where indexes in topology 68 would be the result of a "Pre-order" search), each display determines its own logical index number that is presented to an end user making display setting adjustments. Further all displays of the daisy chain may traverse the addresses to determine the complete topology, numerical index and associated addresses. This allows any display that receives manual inputs to change display settings to coordinate the display settings for all displays in the daisy chain.

Figure 6:
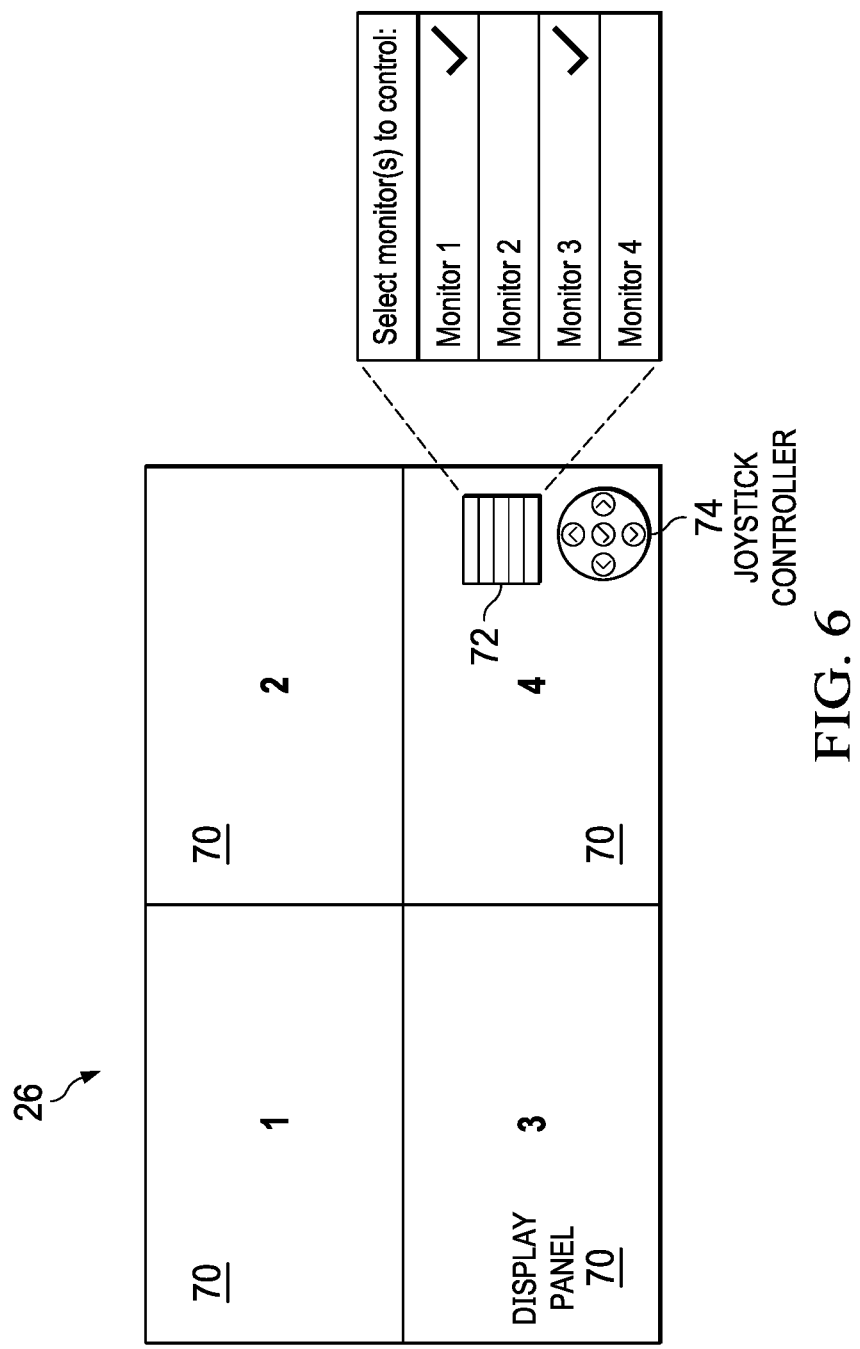
FIG. 6 depicts an example of a user interface for coordinating display setting inputs at daisy chained peripheral displays with a logical index derived from autonomously assigned display addresses.

Referring now to FIG. 6, an example depicts a user interface for coordinating display setting inputs at daisy chained peripheral displays with a logical index derived from autonomously assigned display addresses. In the example embodiment, four daisy chained displays 26 each have their numerical index number of 1-4 presented as a visual image at their display panel 70. The display with index 4 has a manual joystick controller 74 that receives an end user indication of a change in the display settings, which commands the on screen menu 72 to present a user interface with a list of the displays by numerical index. The display then broadcasts a command for each display to present its index number and to listen for remote control settings sent with the display logical index number or address. The end user selects the numerical index values to control with the manual inputs by checking each selected index number and then enters the display setting commands for those displays, such as contrast, brightness or other similar settings. Although the example embodiment accepts inputs at a manual input device, the same on screen display options may be commanded by an information handling system, such as through an operating system driver. As display settings are input to the selected display or information handling system, that display broadcasts the settings and the selected display logical number and/or address so that the display setting is applied to each display in turn. Once the remote control session is complete and the end user exits the display setting menu, the termination of the remote control session is broadcast through the daisy chain and the displays return to local control of display settings.

Although the present invention has been described in detail, it should be understood that various changes, substitutions and alterations can be made hereto without departing from the spirit and scope of the invention as defined by the appended claims.

What is claimed is:

1. A method for managing plural displays interfaced with an information handling system in a daisy chain, the daisy chain having at least two displays arranged as last nodes, the method comprising:
   assigning an address at each of the plural displays based upon a position of each of the plural displays in the daisy chain, the assigning performed by reference to a last address of the at least two displays arranged as last nodes;
   constructing a topology of the plural displays from the address of each of the plural displays, the topology having a logical index number for each of the plural displays;
   initiating a remote control session of the plural displays;
   in response to the initiating, presenting at each of the plural displays the logical index number of the display;
   receiving display settings by reference to the logical index numbers; and
   adjusting each of the plural displays according to the display settings and the logical index numbers;
   wherein the assigning an address further comprises:
   when a one or more of the plural displays has the information handling system immediately upstream in the daisy chain of plural displays, assigning a first address of the daisy chain to the one of the plural displays; and
   when the one or more of the plural displays has another of the plural displays immediately downstream in the daisy chain of plural displays, assigning a second address to the another of the plural displays by appending address information to an address of the one of the plural displays; and
   wherein the constructing a topology further comprises:
   when each of the at least two displays arranged as last nodes detects no downstream displays, sending a last address message to the other displays providing the address of the at least two displays arranged as last nodes;
   analyzing the address of the last address message at each of the plural displays to construct a topology of the daisy chain of plural displays; and
   applying the address of each of the plural displays at each of the plural displays to define a position of the display in the topology.

2. The method of claim 1 wherein the assigning an address further comprises:
   detecting plural another of the plural displays immediately downstream in the daisy chain of plural displays; and
   in response to the detecting, appending address information for each of the plural of another of the plural displays with distinct numerical values.

3. The method of claim 1 further comprising:
   when the one of the plural displays has the information handling system immediately upstream then assigning addresses to all displays in the daisy chain with logic executing on the one of the plural displays.

4. The method of claim 3 further comprising:
   detecting a disconnect of a downstream of the plural displays; and
   in response to the detecting, reassigning all addresses of the plural displays.

5. The method of claim 1 wherein each of the plural displays assigns addresses only to the immediately downstream displays of the daisy chain.

6. The method of claim 1 further comprising:
   initiating the remote control session with a command from the information handling system to the one or more of the plural displays having the information handling system immediately upstream; and
   in response to the command, presenting a list of the plural displays in order of the logical index at the one or more of the plural displays having the information handling system immediately upstream.

7. The method of claim 1 wherein:
   initiating the remote control session with a manual input at one of the plural displays; and
   in response to the command, presenting a list of the plural displays in order of the logical index at the one of the plural displays that had the manual input.

8. A display comprising:
   a display panel operable to present visual information as visual images;
   plural display cable ports operable to accept and to transmit the visual information;
   a processing resource interfaced with the plural display ports and the display panel; and
   non-transient memory interfaced with the processing resource and storing instructions that when executed on the processing resource cause:
   assigning an address at the display based upon a position of the display in a daisy chain of plural displays;
   constructing a topology of the daisy chain of plural displays from the address of each of the plural displays, the topology having a logical index number for each of the plural displays;
   presenting at the display the logical index number of the display;
   receiving display settings by reference to the logical index number; and
   adjusting the display presentation according to the display settings and the logical index numbers;
   wherein the constructing a topology further comprises instructions that cause:
   when the display detects no downstream displays, sending a last address message to the other displays of the daisy chain providing the address of the display;
   when the display receives a last address message having a last address, analyzing the last address to construct a topology of the daisy chain of plural displays; and
   applying the address of each of the plural displays of the topology to define a position of the display in the topology.

9. The display of claim 8 wherein the instructions further cause:
   when the display has an information handling system immediately upstream in the daisy chain of plural displays, assigning a first address of the daisy chain to the display; and
   when the display has one or more of the plural displays immediately downstream in the daisy chain of plural displays, assigning a second address to the one or more of the plural displays by appending address information to an address of the display.

10. The display of claim 9 wherein the instructions further cause:
    detecting plural of the plural displays downstream in the daisy chain of plural displays; and
    in response to the detecting, appending address information to the address of the display for an address of each of the plural displays with distinct numerical values.

11. The display of claim 10 wherein the instructions further cause:
    detecting a disconnect of a downstream of the plural displays; and
    in response to the detecting, reassigning all addresses of the downstream displays.

12. The display of claim 9 wherein the instructions further assigns an address only to the immediately downstream display of the daisy chain.

13. The display of claim 8 wherein the instructions further cause:
    initiating a remote control session with a manual input at the display; and
    in response to the command, presenting at the display a list of the plural displays of the topology in order of the logical index.

* * * * *